US009078257B2

(12) United States Patent
Fong et al.

(10) Patent No.: US 9,078,257 B2
(45) Date of Patent: Jul. 7, 2015

(54) RANDOM BACKOFF FOR EXTENDED ACCESS BARRING

(75) Inventors: Mo-Han Fong, Sunnyvale, CA (US); Umesh Phuyal, Hillsboro, OR (US)

(73) Assignee: INTEL COPRORATION, Santa Clara, CA (US)

( * ) Notice: Subject to any disclaimer, the term of this patent is extended or adjusted under 35 U.S.C. 154(b) by 75 days.

(21) Appl. No.: 13/538,865

(22) Filed: Jun. 29, 2012

(65) Prior Publication Data

US 2013/0170479 A1    Jul. 4, 2013

Related U.S. Application Data

(60) Provisional application No. 61/558,670, filed on Nov. 11, 2011.

(51) Int. Cl.
*H04Q 7/00* (2006.01)
*H04W 72/04* (2009.01)
*H04W 74/08* (2009.01)
*H04W 48/02* (2009.01)

(52) U.S. Cl.
CPC ........ *H04W 72/0446* (2013.01); *H04W 74/085* (2013.01); *H04W 48/02* (2013.01)

(58) Field of Classification Search
CPC ..... H04W 80/04; H04W 88/06; H04W 88/08; H04W 28/04; H04W 72/04; H04L 5/0007
USPC ......................................... 370/329, 328, 330
See application file for complete search history.

(56) References Cited

U.S. PATENT DOCUMENTS

| | | | |
|---|---|---|---|
| 8,780,810 B2 * | 7/2014 | Ryu et al. ........................ | 370/328 |
| 2006/0063544 A1 | 3/2006 | Zhao et al. | |
| 2009/0257421 A1 * | 10/2009 | Nakashima et al. .......... | 370/345 |
| 2011/0280210 A1 * | 11/2011 | Zhang et al. .................. | 370/329 |
| 2012/0033613 A1 * | 2/2012 | Lin et al. ........................ | 370/328 |
| 2012/0051297 A1 * | 3/2012 | Lee et al. ........................ | 370/329 |
| 2013/0039309 A1 * | 2/2013 | Chiu ............................... | 370/329 |
| 2013/0044702 A1 * | 2/2013 | Jayaraman et al. ........... | 370/329 |
| 2013/0051325 A1 * | 2/2013 | Ryu et al. ...................... | 370/328 |
| 2013/0107778 A1 * | 5/2013 | Ryu et al. ...................... | 370/311 |

(Continued)

FOREIGN PATENT DOCUMENTS

KR    10-2006-0021505 A    3/2006

OTHER PUBLICATIONS

U.S. Appl. No. 61/523,769, filed Aug. 15, 2011.*

(Continued)

*Primary Examiner* — Chuong T Ho
(74) *Attorney, Agent, or Firm* — Thorpe North & Western LLP

(57) ABSTRACT

Technology for initiating a random access procedure by a wireless device after extended access barring (EAB) is disclosed. The wireless device can release a bar on the wireless device. The bar can prevent the wireless device from accessing a node using EAB. The wireless device can count a random backoff time using a random backoff timer. The random backoff time can include a random time between zero and a maximum backoff time period. The wireless device can transmit a random access channel (RACH) message (including physical random access channel (PRACH) preamble) from the wireless device to the node to initiate a random access procedure after the expiry of the random backoff timer.

25 Claims, 12 Drawing Sheets

(56) References Cited

U.S. PATENT DOCUMENTS

2013/0114516 A1* 5/2013 Koo et al. .................. 370/329
2014/0071930 A1* 3/2014 Lee et al. .................. 370/329

OTHER PUBLICATIONS

U.S. Appl. No. 61/523,393, filed Aug. 14, 2011.*
U.S. Appl. No. 61/551,897, filed Oct. 26, 2011.*
U.S. Appl. No. 61/529,181, filed Aug. 30, 2011.*
3rdGeneration Partnership Project;Technical Specification Group Services and System Aspects;System Improvements for Machine-Type Communications; 3GPP TR 23.888 V1.0.0 , Release 10, Jul. 2010, 80 pages.
International Search Report and Written Opinion received for PCT Application No. PCT/US2012/064567, mailed on Jan. 25, 2013, 11 pages.

* cited by examiner

RANDOM BACKOFF FOR EXTENDED ACCESS BARRING

RELATED APPLICATIONS

This application claims the benefit of and hereby incorporates by reference U.S. Provisional Patent Application Ser. No. 61/558,670, filed Nov. 11, 2011.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use OFDM modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of evolved universal terrestrial radio access network (E-UTRAN) Node Bs (also commonly denoted as evolved Node Bs, enhanced Node Bs, eNodeBs, or eNBs) and radio network controllers (RNCs), which communicates with the wireless device, known as a user equipment (UE). The downlink (DL) transmission can be a communication from the node (or eNodeB) to the wireless device (or UE), and the uplink (UL) transmission can be a communication from the wireless device to the node. Furthermore, the nodes can be connected to a mobility management entity (MME) located in the core network by means of the S1 interface.

Another technology for mobile communication is a universal mobile telecommunications system (UMTS), which is a 3GPP mobile cellular technology for networks using code division multiple access (CDMA). In UMTS, the node can be a combination of Node Bs (also commonly denoted as NodeBs or NBs) and radio network controllers (RNCs), which communicates with the wireless device, known as the UE. UMTS can specify a network system, covering the UMTS terrestrial radio access network (UTRAN), a core network (including a mobile application part (MAP)), and an authentication of users via subscriber identity module (SIM) cards. The RNCs can be connected to the core network by means of the Iu interface.

Under certain circumstances, known as access barring, a node can prevent or restrict wireless device users from making access attempts, which can include emergency call attempts, or responding to pages in specified areas of a public land mobile network (PLMN). Such situations can include states of emergency or failure of one or more co-located PLMNs. Access class barring (ACB) can be used to prevent wireless devices from making access attempts to the node in LTE systems and UMTS.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
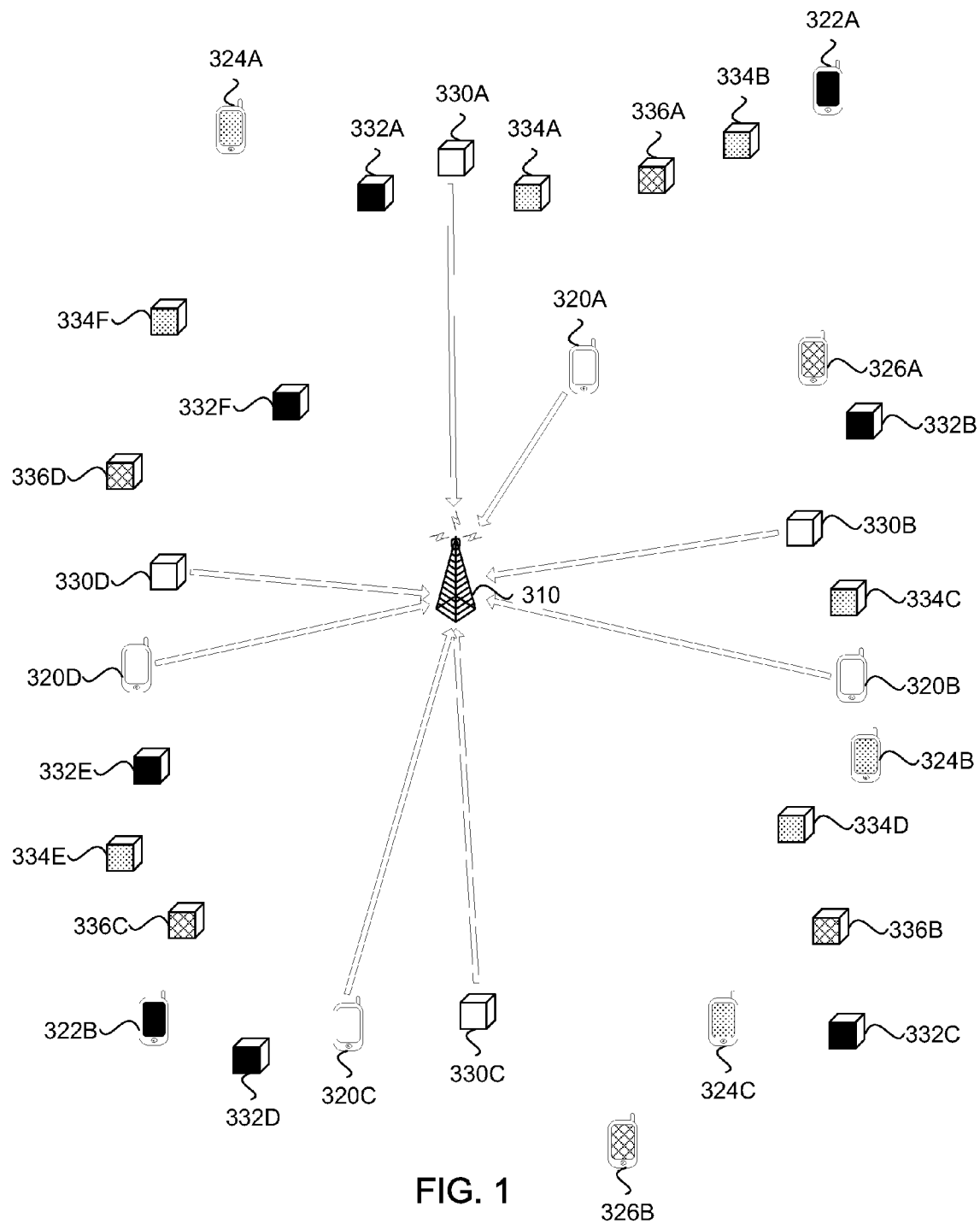
FIG. 1 illustrates a block diagram of a plurality of wireless devices without extended access barring (EAB) transmitting a physical random access channel (PRACH) preamble to a node in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A large number of machine type communication (MTC) devices and/or machine-to-machine (M2M) devices may access a radio access network (RAN). As used herein, MTC and M2M may be used interchangeably. The MTC devices may overload the RAN and a core network (CN) supporting the RAN. Overload control and protection mechanisms may be provided in a network to reduce overload conditions due to a large number of MTC devices that the RAN and core network may support.

Access barring, such as extended access barring (EAB), can provide overload control and protection of the network, including the RAN and the CN. Access barring can allow the network to bar the access of low priority and/or delay tolerant MTC devices or services when the network (e.g., the RAN or the core network) and/or a network component (e.g., a node) is overloaded. As used herein, delay tolerant and low priority may be used interchangeably. Access barring, such as access class barring (ACB) and extended access barring (EAB), allows a node to broadcast messages which can prevent or restrict wireless device users from making access attempts at the node. Broadcast messages can be available on a cell by cell basis indicating the class(es) or categories of subscribers barred from network access. Access barring allows a network operator to prevent overload of the radio access network and core network.

In an example, wireless devices can be members of one out of ten randomly allocated mobile populations, defined as access classes 0 to 9. A population number can be stored in a subscriber identity module or subscriber identification module (SIM) or universal subscriber identity module (USIM). In addition, wireless devices may be members of one or more special categories (e.g., access classes 11 to 15), also held in the SIM/USIM. The special categories can be allocated to specific high priority users. Class 15 can be allocated to public land mobile networks (PLMNs) staff, class 14 can be allocated to emergency services, class 13 can be allocated to public utilities (e.g., water/gas suppliers), class 12 can be allocated to security services, and class 11 can be allocated for PLMN use.

In ACB, if the wireless device is a member of at least one access class (AC) which corresponds to permitted classes as signaled over an air interface, and the access class is applicable in the serving network, access attempts may be allowed. Classes 0-9 can be allowed in home public land mobile networks (PLMNs) and visited PLMNs (VPLMNs). Classes 11 and 15 can be allowed in a home PLMN (HPLMN) if an equivalent home PLMN (EHPLMN) list is not present, or any EHPLMN. Classes 12, 13, or 14 can be allowed in the HPLMN and VPLMNs of a home country. A home country can be the country of the mobile country code (MCC) part of the international mobile subscriber identity (IMSI). Any number of these classes may be barred at any one time.

EAB can provide additional access barring over ACB. Extended access barring (EAB) can include a mechanism for the operator(s) (e.g., network operators) to control mobile originating access attempts from wireless devices configured for EAB in order to prevent overload of the access network and/or the core network. In congestion situations, the operator can restrict access from wireless devices configured for EAB while permitting access from other wireless devices. Wireless devices configured for EAB can be considered more tolerant to access restrictions than other wireless devices. The network can broadcast information to provide EAB control for wireless devices in a specific area when an operator or some automated process determines to apply EAB, such as an overload condition or other triggering event.

A wireless device configured for EAB can be categorized based on the wireless device's roaming category (a wireless device's relationship to the PLMN, which supports a node). The node in the RAN of the PLMN can use a broadcast control channel (BCCH) to broadcast EAB information to wireless devices. The EAB information on the BCCH can indicate which category of wireless devices configured with EAB can apply EAB. Access barring information (e.g. the EAB information) can be transmitted in the BCCH using a system information block (SIB) or a master information block (MIB). Wireless devices configured with EAB can check their categories (e.g., category A, B, or C, discussed below) in order to determine whether or not to apply EAB. In an example, two bits can be used to indicate the roaming category on which EAB parameters are applied to the wireless device.

EAB can bar different types or categories of wireless devices than ACB, and/or EAB can provide different barring mechanisms than ACB. EAB may be configured for delay tolerant access wireless devices, such as MTC wireless devices, instead of all wireless devices in ACB. Wireless devices configured for EAB can be more tolerant to access restrictions (e.g., delay tolerant) than other wireless devices. EAB can be used to handle roamers, or wireless devices operating outside a HPLMN and/or EHPLMN. For a wireless device configured with EAB, EAB may take precedence over ACB.

In an example, the EAB parameters can include a barring bitmap where each bit corresponds to an access class (AC). A total of 10 bits can be used for AC 0-9. For example, when a particular bit in the barring bitmap is set to "1" (e.g., a logical or digital one or a set flag), the corresponding AC can be barred. Otherwise, the particular bit in the barring bitmap is set to "0" (e.g., a logical or digital zero or a non-set flag), the corresponding AC may not be barred.

MTC devices can be numerous in a cell or the RAN. With MTC usage, a large number of MTC wireless devices can have bursty access to the node, which can overload the node and/or the network. In an overload condition, the random access channel (RACH) may be overloaded, which may block access of a normal priority wireless device (non-delay tolerant access wireless device, non-low priority access wireless device, or high priority wireless device) for a substantial period of time. Normal priority wireless devices can have blocked access because other wireless devices' transmissions may interfere with the node's reception of normal priority wireless devices' RACH, so the node cannot decode the transmission. EAB can be employed to block or bar a random access procedure from being performed on wireless devices configured for EAB, or EAB can be employed to block or bar a transmission on the RACH by wireless devices configured for EAB. As a result, EAB can reduce the overload on the RACH.

When the access (e.g., radio resource control (RRC) connection establishment) of a particular AC is barred, pending requests and traffic of a large number of wireless devices (e.g., MTC devices and UEs) with that AC can continue to build up. At the time the network (e.g., node) releases the barring of that AC (i.e., by setting the corresponding bit in the barring bitmap to '0'), a large number of wireless devices with pending uplink (UL) traffic can start to perform random access (RA) procedure by transmitting on the RACH. The substantially concurrent transmission on the RACH by the wireless devices of the AC released from the EAB bar can generate a high collision rate on the RACH, which can cause RA failure.

In an example, a random backoff timer or a backoff indicator can be used as a mechanism to distribute the RA requests of wireless devices of a particular class when the access barring of that class is changed from 'barred' to 'not-barred'. With the random backoff timer or the backoff indicator, the collision rate on the RACH can be reduced significantly. The random backoff timer or the backoff indicator can apply to both a LTE RAN and an UMTS RAN.

In an example, a node can authorize wireless devices to access the node using EAB. The wireless devices can receive EAB configuration information in a BCCH from the node. The EAB configuration information can bar specified wireless devices configured for EAB.

FIG. 1 illustrates an example of EAB applied to category A wireless devices 322A-B, 324A-C, 326A-B, 332A-F, 334A-F, and 336A-D allowing other wireless devices (or normal priority wireless devices) 320A-D and 330A-D in a cell to transmit a RACH to (and subsequently communicate with) the node 310 without the category A wireless devices accessing the node. In an example, the category A wireless devices can include 322A-B, 324A-C, 326A-B, 332A-F, 334A-F, and 336A-D. The category B wireless devices can include 322A-B, 326A-B, 332A-F, and 336A-D. The category C wireless devices can include 322A-B and 332A-F.

The EAB configuration information can include an EAB barring category, also referred to as a roaming category. In an example, EAB barring categories can use a two-bit field for category A, B, or C. For example, '00' can correspond to category A wireless devices, '01' can correspond to category B wireless devices, and '10' can correspond to category C wireless devices.

In an example, category A can indicate wireless devices that are configured for EAB. Category B can indicate wireless devices that are configured for EAB and are neither in the wireless device's HPLMN nor in a PLMN equivalent to the wireless device's HPLMN (EHPLMN). Category C can indicate wireless devices that are configured for EAB and are neither in the PLMN listed as most preferred PLMN of the country where the wireless device is roaming in an operator-defined PLMN selector list on the SIM/USIM, nor in the wireless device's HPLMN nor in a PLMN that is equivalent to the wireless device's HPLMN.

A public land mobile network (PLMN) can include a network established and operated by a regulatory body, an administration, or a recognized private operating agency (RPOA) for a specific purpose of providing land mobile communication services to the public. A relationship can exist between each subscriber and the subscriber's home PLMN (HPLMN). If communications are handled over to another PLMN, the other PLMN can be referred to as a visited PLMN (VPLMN). A PLMN may provide service in one, or a combination, of frequency bands. A PLMN can be defined by borders of a country. More than one PLMN can exist in a country. The PLMN area can be the geographical area in which a PLMN provides communication services.

In an example, the three categories can be mutually exclusive, where wireless devices in category A are not in category B or category C, and wireless devices in category B are not in category A or category C, and wireless devices in category C are not in category A or category B.

In another example (e.g., FIG. 1), each subcategory can be a superset of another category. For example, category A can be a superset of category B and category B can be a superset of category C, which can mean EAB applicable to category A wireless devices can apply to categories B and C wireless devices. Stated another way, category C can be a subset of category B and category B can be a subset of category A, which can mean EAB applicable to category B wireless devices can apply to categories C wireless devices, but may not apply to category A wireless devices.

Figure 2:
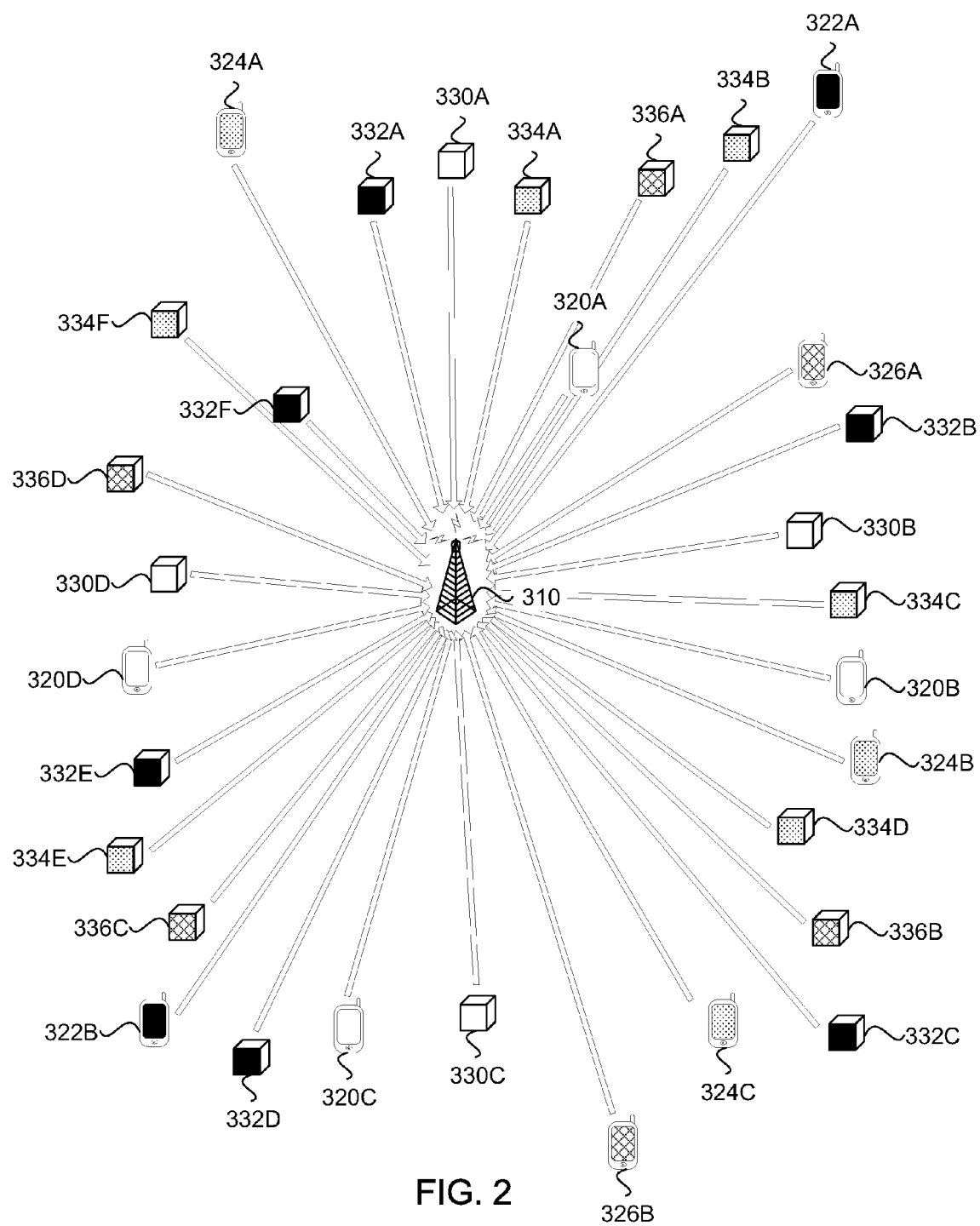
FIG. 2 illustrates a block diagram of a plurality of wireless devices transmitting a physical random access channel (PRACH) preamble to a node shortly after extended access barring (EAB) is released in accordance with an example.

FIG. 2 illustrates an example of a plurality of wireless devices 320A-D, 322A-B, 324A-C, 326A-B, 330A-D, 332A-F, 334A-F, and 336A-D in a cell transmitting a RACH to a node 310 at a same time frame (or near the same time frame) generating an overload condition on the RACH after a EAB bar has been released without the random backoff timer or the backoff indicator. The cell can be a logical definition generated by the transmitting station or geographic transmission area or sub-area covered by the transmitting station, which can include a specific cell identification (ID) that defines the parameters for the cell, such as control channels, reference signals, and component carriers (CC) frequencies. The wireless devices in the cell can include user devices 320A-D, 322A-B, 324A-C, and 326A-B and MTC or M2M devices 330A-D, 332A-F, 334A-F, and 336A-D. The wireless devices in the cell can include normal priority wireless devices (non-delay tolerant wireless devices) 320A-D and 330A-D and delay tolerant wireless devices 322A-B, 324A-C, 326A-B, 332A-F, 334A-F, and 336A-D. Although EAB can be well suited to MTC devices, EAB can be applied to other wireless devices (user devices) as well. Additionally, a MTC device can have normal priority access and may not be configured for EAB. EAB can be used to limit the access of delay tolerant access devices, such as MTC wireless devices. Delay tolerant access can be access that is subject to EAB.

Figure 3:
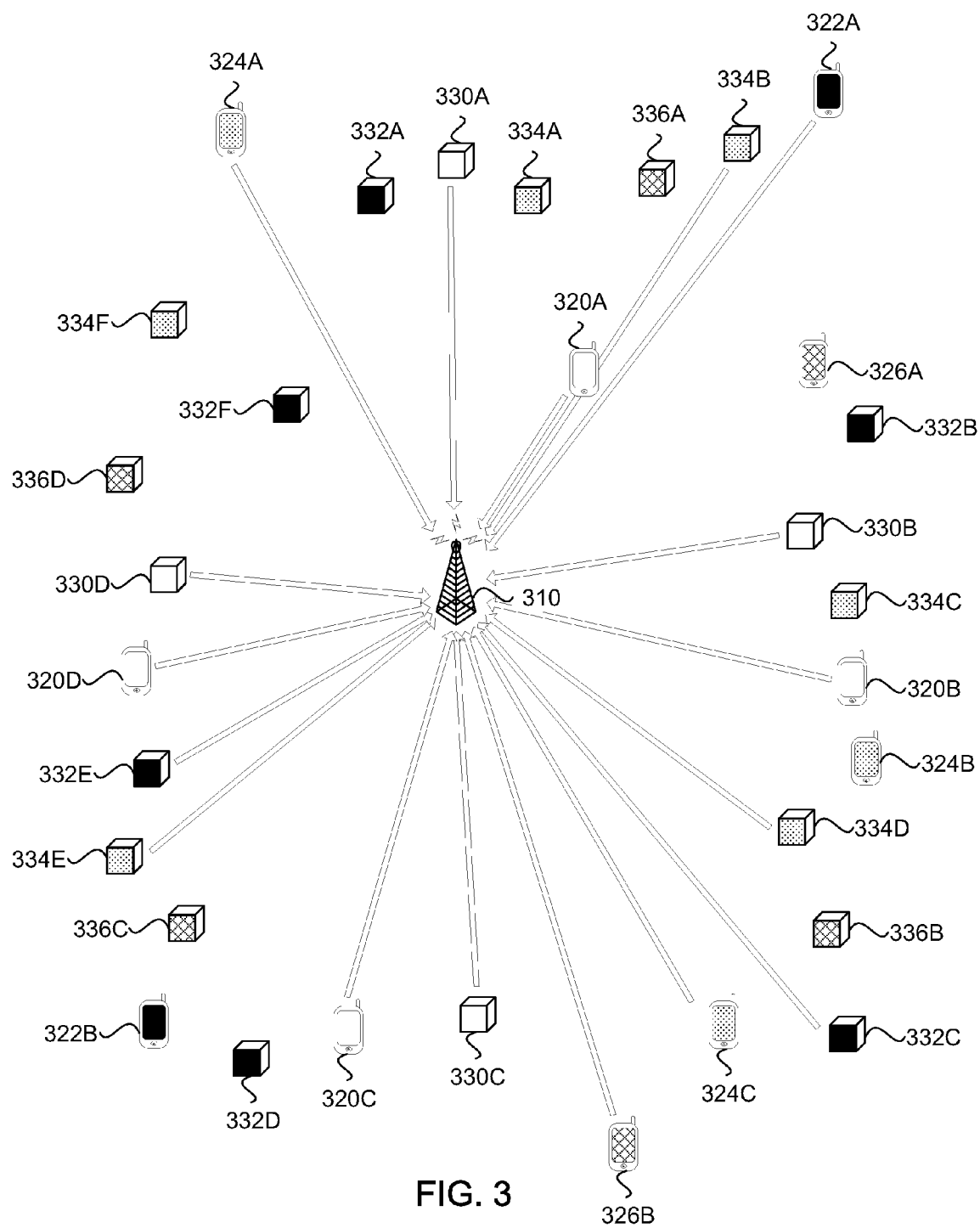
FIG. 3 illustrates a block diagram of a plurality of wireless devices including machine type communication (MTC) devices with a random backoff timer transmitting a physical random access channel (PRACH) preamble to a node shortly after extended access barring (EAB) is released in accordance with an example.

FIG. 3 illustrates an example of a plurality of wireless devices 320A-D, 322A, 324A and 324C, 326B, 330A-D, 332C and 332E, and 334B and 334D-E in a cell transmitting a RACH to a node 310 at a time frame shortly after an EAB bar has been released where delay tolerant devices are using the random backoff timer or the backoff indicator to reduce an overload condition on the RACH. The random backoff timer or the backoff indicator can prevent EAB wireless device from transmitting on the RACH for a random back off time, where the random backoff time is a random time between zero and a maximum backoff time period.

Figure 4:
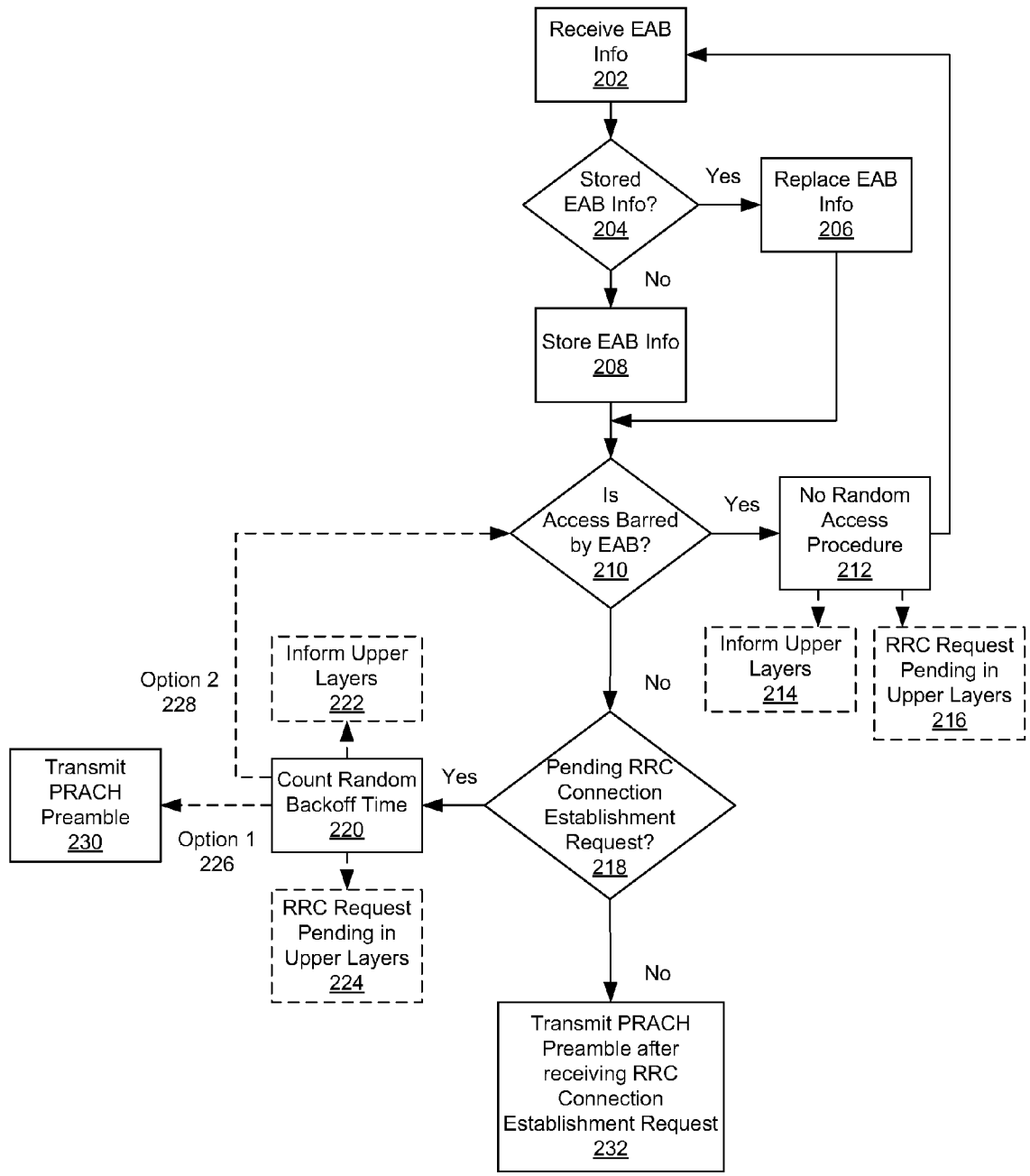
FIG. 4 depicts a flow chart of applying a random backoff before performing random access for wireless devices that have pending radio resource control (RRC) connection establishment request in accordance with an example.

The following provides additional details of the examples. FIG. 4 illustrates a flow chart of applying a random backoff before performing random access (RA) for wireless devices that have pending radio resource control (RRC) connection establishment request and access is not barred in the updated extended access barring (EAB) information for the wireless devices.

When a wireless device (e.g., UE), which has pending RRC connection establishment request, receives EAB information that lifts the access barring for the wireless device, the wireless device can first perform a random backoff delay before starting a RA procedure. The random backoff delay can prevent a large number of wireless devices that have pending RRC connection establishment request to cluster their RACH transmissions within a short time frame right after the EAB access barring is lifted, which can reduce a probability for a physical random access channel (PRACH) preamble collision. For a wireless device that does not have pending RRC connection establishment request, a random backoff delay may not be applied. When the wireless device without a pending RRC connection establishment request initiates a RRC connection establishment request and access is not barred, the wireless device can start the RA procedure without any random backoff delay.

Referring to FIG. 4, the wireless device configured with EAB can receive EAB information 202 broadcast from the network (e.g., the node). The wireless device can determine if EAB information has been previously stored in the wireless device 204. If EAB information has not been previously stored in the wireless device, the wireless device can store the received EAB information 208. If previously received EAB information has been stored in the wireless device, the wireless device can replace the existing stored EAB information 206 with the current EAB information received. From the EAB information, the wireless device can determine if access is barred by EAB 210. If the received EAB information indicates that the access is barred, the wireless device may not perform random access procedure 212 for an RRC connection establishment for mobile originating calls. In one embodiment, the wireless device can inform the upper layers 214 that the access is barred. In another embodiment, the RRC connection establishment request from the upper layers can be pending 216 or queued at an access stratum (AS). The upper layers can include the media access control (MAC) or the radio resource control (RRC) layers. A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. If the received EAB information indicates that the access is barred, the wireless device can wait until updated EAB information releases the EAB for the EAB class associated with the wireless device (e.g., unbarring the wireless access for the associated EAB class).

If the received EAB information indicates that the access is not barred, the wireless device can determine if the wireless device has a pending RRC connection establishment request 218 from the upper layers. If the wireless device has pending RRC connection establishment request from the upper layers, the wireless device can apply a random backoff delay (e.g., count a random backoff time 220) before performing PRACH preamble transmission 230. In an example, the random backoff time can be calculated according to a uniform distribution between 0 and a maximum backoff time period (e.g., a max_backoff_EAB value, where the max_backoff_EAB can be a maximum possible value for the random backoff time). The wireless device can set a random backoff timer (e.g., Tbarring-EAB) to the calculated random backoff time. In an embodiment, the maximum backoff time period can be configured by the node (e.g., NB or eNB) via broadcast or unicast RRC signaling. In an example (option 1 226), the wireless device may start the RA procedure (including the PRACH preamble transmission 230) after the expiry (e.g., expiration) of the random backoff timer. In another example (option 2 228), the wireless device may check to the EAB information to determine if access is still not barred after the expiry (e.g., expiration) of the random backoff timer and before starting the RA procedure. In an embodiment, when access is barred prior to the expiry of random backoff timer, the RRC connection establishment request from upper layers is pending 224 or queued at the access stratum. In another embodiment, after the wireless device calculates the random backoff time, the wireless device can inform the upper layers 222 that the access is barred and can provide a value of random backoff time to the upper layers. The upper layers may request establishment of an RRC connection after random backoff time has elapsed.

When the upper layers request an establishment of an RRC connection while the wireless device is in an RRC_IDLE mode, the wireless device can check for the stored EAB information 208. If the stored EAB information is present and the stored EAB information indicates that the access is barred, the wireless device may not perform random access procedure 212 for RRC connection establishment for mobile originating calls. In one embodiment, the wireless device can inform the upper layers that the access is barred 214. In another embodiment, the RRC connection establishment request from upper layers can be pending 216 or queued at the access stratum. If no EAB information is stored or the stored EAB information indicates that the access is not barred, the wireless device can perform random access procedure (i.e., without a backoff delay) for RRC connection establishment for mobile originating calls. For example, the wireless device can perform a PRACH preamble transmission after receiving the RRC connection establishment request 232 when no EAB information is stored or the stored EAB information indicates that the access is not barred.

Figure 5:
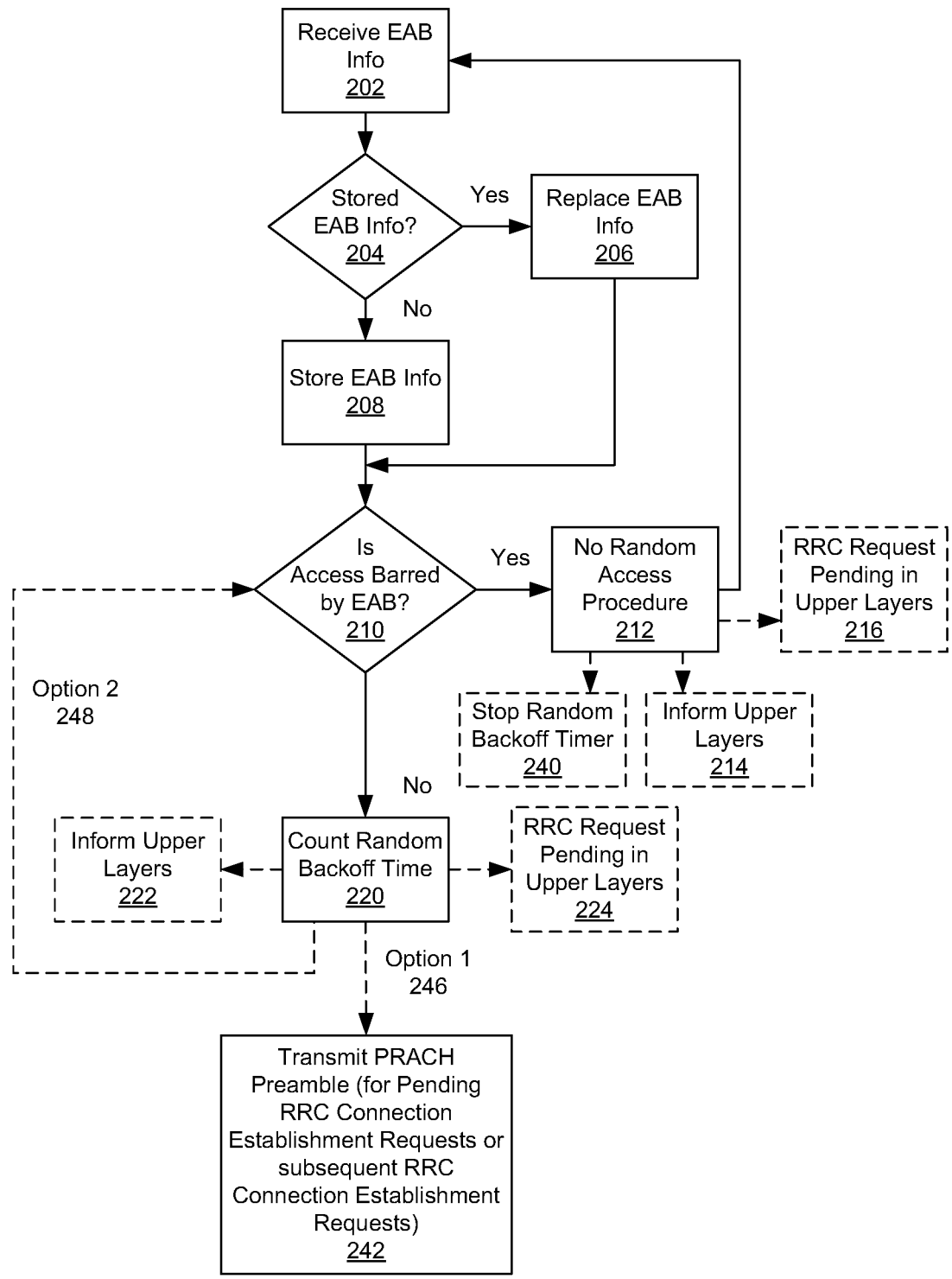
FIG. 5 depicts a flow chart of applying random backoff for wireless devices when access is not barred in updated extended access barring (EAB) information in accordance with an example.

FIG. 5 illustrates a flow chart of applying random backoff for wireless devices when access is not barred in updated extended access barring (EAB) information. When a wireless device, which is currently barred from accessing a node, receives EAB information that indicates that access is not barred, the wireless device can start a random backoff timer. Prior to the expiry of the random backoff timer, the wireless device can determine if access to the node is still barred. If access to the node is still barred after the expiry of the random backoff timer, the wireless device may not initiate the RA procedure and can wait until updated EAB information releases the EAB. After the expiry of the timer, the wireless device can determine if access is not barred and can start RA procedure if the wireless device initiates an RRC connection establishment request. Relative to the example illustrated by FIG. 4, the wireless devices in the example illustrated by FIG. 5 when access barring is lifted by the latest EAB information can experience a random backoff delay regardless of presence or absence of pending RRC connection establishment request.

Referring to FIG. 5, the wireless device configured with EAB can receive EAB information 202 broadcast from the network (e.g., eNB or NB). The wireless device can determine if EAB information has been previously stored in the wireless device 204. If EAB information has not been previously stored in the wireless device, the wireless device can store the received EAB information 208. If previously received EAB information has been stored in the wireless device, the wireless device can replace the existing stored EAB information 206 with the current EAB information received. From the EAB information, the wireless device can determine if access is barred by EAB 210. If the received EAB information indicates that the access is not barred, the wireless device can apply a random backoff delay (e.g., count a random backoff time 220) before performing RACH transmission. If the random backoff timer (e.g., Tbarring-EAB) is disabled, the wireless device can start the random backoff timer and can set the value to a random backoff time calculated according to a uniform distribution between 0 and a maximum backoff time period (e.g., a max_backoff_EAB value, where the max_backoff_EAB can be a maximum possible value for the random backoff time). In an embodiment, the maximum backoff time period can be configured by the node (e.g., NB or eNB) via broadcast or unicast RRC signaling. In an embodiment, after the wireless device calculates the random backoff time, the wireless device can inform the upper layers 222 that the access is barred and can provide a random backoff time to the upper layers. The upper layers may request establishment of an RRC connection after the random backoff time has elapsed. In another embodiment, the wireless device does not inform the upper layers that the access is barred. The RRC connection establishment request from upper layers can be pending 224 or queued at the access stratum.

If the received EAB information indicates that the access to the node is barred, the wireless device may not perform random access procedure 212 for an RRC connection establishment for mobile originating calls. In an embodiment, if the random backoff timer (e.g., Tbarring-EAB) is running, the wireless device can stop 240 and disable the random backoff timer. In another embodiment, the wireless device may not stop or disable the random backoff timer. In an embodiment, the wireless device can inform the upper layers 214 that the access is barred. In another embodiment, the wireless device may not inform the upper layers that the access is barred. The RRC connection establishment request from upper layers can be pending 216 or queued at the access stratum.

When the upper layers request an establishment of an RRC connection while the wireless device is in an RRC_IDLE mode, the wireless device can check for the stored EAB information 208. In an embodiment, if the stored EAB information is present and the stored EAB information indicates that the access is barred, the wireless device may not perform random access procedure 212 for RRC connection establishment for mobile originating calls. In another embodiment, if the random backoff timer (e.g., Tbarring-EAB) is running 220, the wireless device may not perform random access procedure for RRC connection establishment for mobile originating calls. Otherwise, if the random backoff timer is enabled but has expired, wireless device can perform random access procedure for RRC connection establishment for mobile originating calls. For example, the wireless device can perform a RACH transmission after receiving the RRC connection establishment request 242 (for pending RRC connection establishment requests or subsequent RRC connection establishment request) when no EAB information is stored or the stored EAB information indicates that the access is not barred.

When the wireless device does not perform random access procedure 212 or 220 for RRC connection establishment for mobile originating calls, the wireless device can inform upper layers 214 or 222 that the RRC connection establishment request is barred. In an embodiment, the wireless device provides the value of the random backoff timer to the upper layers 222 if the random backoff timer is running. The upper layers may request an establishment of an RRC connection after a time that corresponds to the value of the random backoff timer has elapsed. In another embodiment, the wireless device may not inform the upper layers that the access is barred. The RRC connection establishment request from upper layers can be pending 216 or 224 or queued at the access stratum.

If no EAB information is stored or the stored EAB information indicates that the access is not barred, and the random backoff timer is running 220, the wireless device may not perform the random access procedure for RRC connection establishment for mobile originating calls. The wireless device can inform upper layers 222 that the RRC connection establishment request is barred. In an embodiment, the wireless device can provide the value of the random backoff timer to the upper layers. The upper layers may request an establishment of an RRC connection after a time that corresponds to the value of the random backoff time that has elapsed. In another embodiment, the wireless device may not inform the upper layers that the access is barred. The RRC connection establishment request from upper layers can be pending 224 or queued at the access stratum.

If no EAB information is stored or the stored EAB information indicates that the access is not barred, and the random backoff timer is not running or has expired (option 1 246), the wireless device can perform random access procedure for a new, pending, or queued RRC connection establishment request 242 for mobile originating calls. In another example (option 2 248), the wireless device may check to the EAB information to determine if access is still not barred after the expiry (e.g., expiration) of the random backoff timer and before starting the RA procedure. In an embodiment, the wireless device can stop and disable the random backoff timer. In another embodiment, the wireless device may not stop or disable the random backoff timer.

Figure 6:
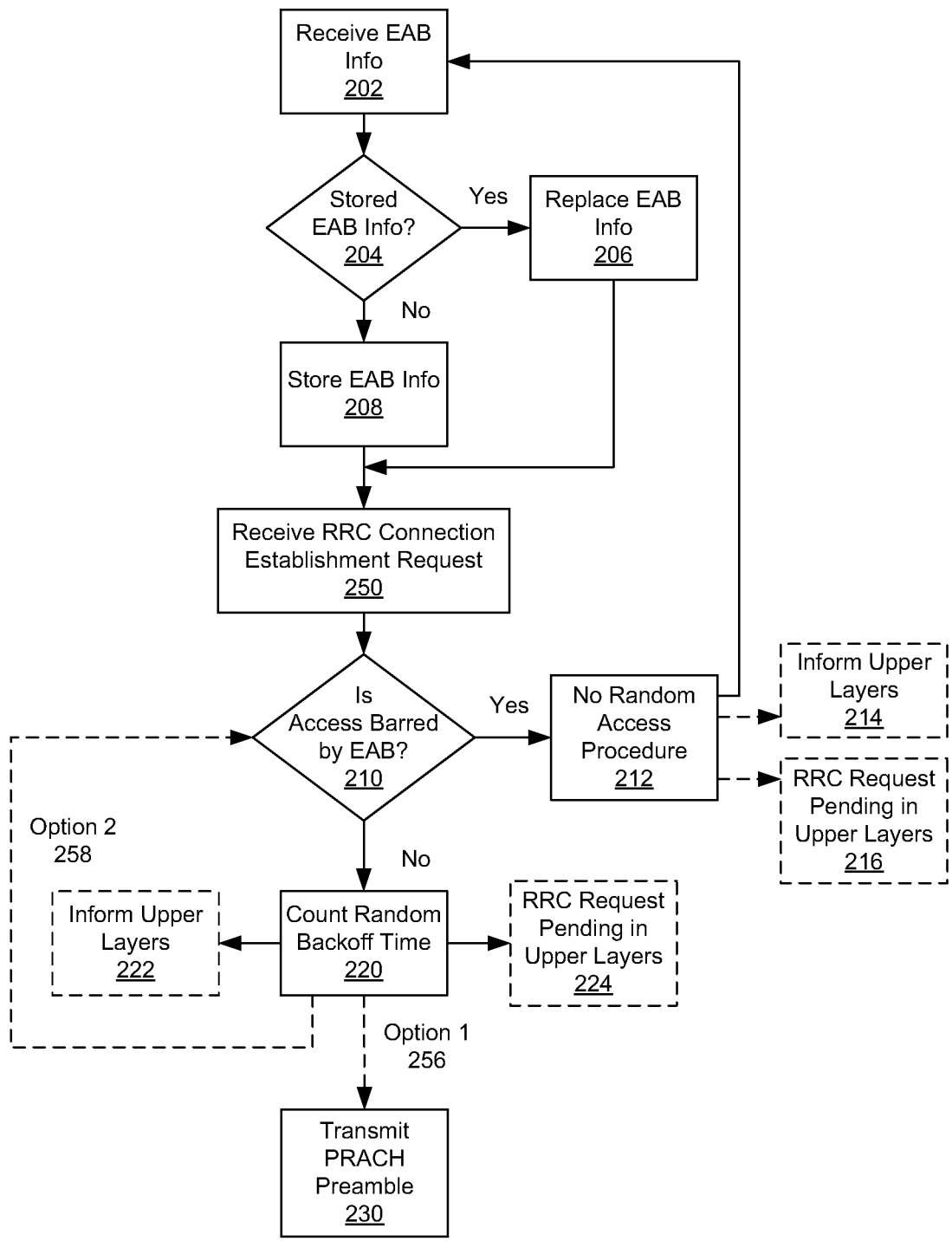
FIG. 6 depicts a flow chart of applying random backoff before performing random access for wireless devices when access is not barred in updated extended access barring (EAB) information in accordance with an example.

FIG. 6 illustrates a flow chart of applying random backoff before performing random access for wireless devices when access is not barred based on the latest extended access barring (EAB) information. The wireless device when access is not barred based on the latest EAB information can perform a random backoff after the wireless device wants to start the RA procedure to initiate RRC connection establishment request. The wireless device configured with EAB can receive EAB information 202 broadcast from the network (e.g, the node). The wireless can determined if EAB information has been previously stored in the wireless device 204. If EAB information has not been previously stored in the wireless device, the wireless device can store the received EAB information 208. If previously received EAB information has been stored in the wireless device, the wireless device can replace the existing stored EAB information 206 with the current EAB information received.

The wireless device can generate a RRC connection establishment request 250 from the upper layers. When the upper layers request an establishment of an RRC connection while the wireless device is in RRC_IDLE mode, the wireless device can check the current EAB information. From the EAB information, the wireless device can determine if access is barred by EAB 210. If the EAB information is present and the EAB information indicates that the access is barred, the wireless device may not perform random access procedure 212 for RRC connection establishment for mobile originating calls.

The wireless device can inform upper layers 214 that the RRC connection establishment request is barred. In another embodiment, the wireless device may not inform the upper layers that the access is barred. The RRC connection establishment request from upper layers can be pending 216 or queued at the access stratum.

If no EAB information is stored or the EAB information indicates that the access is not barred, the wireless device can perform a random backoff (e.g., count a random backoff time 220) before performing PRACH preamble transmission. The random backoff time can be calculated according to a uniform distribution between 0 and a maximum backoff time period (e.g., a max_backoff_EAB value, where the max_backoff_EAB can be a maximum possible value for the random backoff time). The wireless device can set a random backoff timer (e.g., Tbarring-EAB) to the calculated random backoff time. In an embodiment, the maximum backoff time period can be configured by the node (e.g., NB or eNB) via broadcast or unicast RRC signaling. In an example (option 1 256), the wireless device can start the RA procedure (including the PRACH preamble transmission 230) after the expiry (e.g., expiration) of the random backoff timer. In another example (option 2 258), the wireless device may check to the EAB information to determine if access is still not barred after the expiry (e.g., expiration) of the random backoff timer. In an embodiment, after the wireless device calculates the random backoff time, the wireless device can inform the upper layers 222 that the access is barred and can provide the random backoff time to the upper layers. The upper layers may request establishment of an RRC connection after the random backoff time has elapsed. In another embodiment, the wireless device may not inform the upper layers that the access is barred. The RRC connection establishment request from upper layers can be pending 224 or queued at the access stratum.

Figure 7:
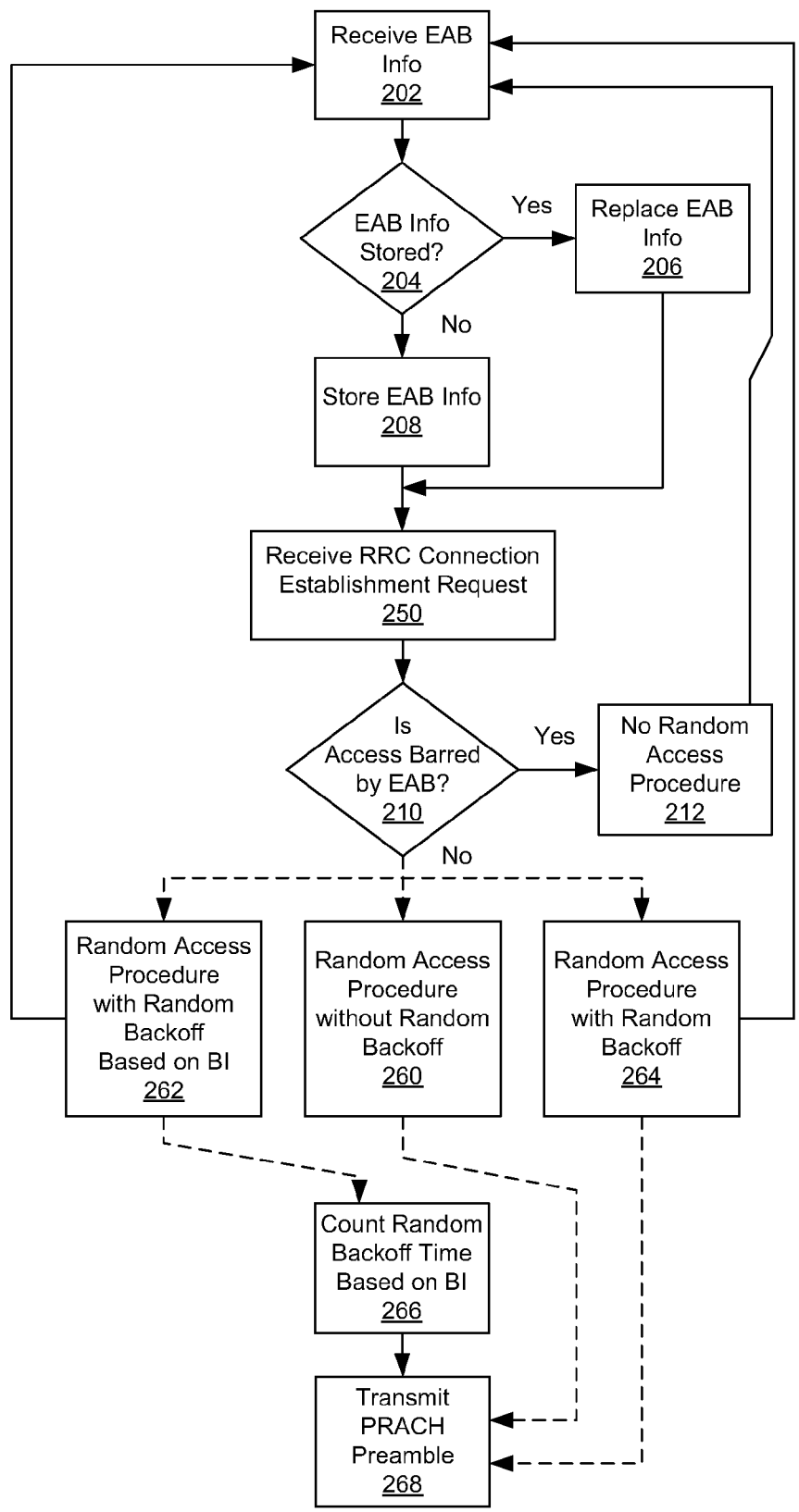
FIG. 7 depicts a flow chart of applying random backoff before retransmission of physical random access channel (PRACH) preamble for wireless devices when access is not barred in updated extended access barring (EAB) information in accordance with an example.

FIG. 7 illustrates a flow chart of applying random backoff or not applying random backoff before retransmission of physical random access channel (PRACH) preamble for wireless devices when access is not barred based on the extended access barring (EAB) information received. An adaptive random backoff can be applied to the retransmission of PRACH at the wireless device. The adaptive random backoff can be based on a backoff indicator (BI) signaled by the node (e.g., eNB or NB). The random backoff time can be calculated according to a uniform distribution between 0 and a backoff parameter value as indicated by a BI field. In an example, the backoff parameter value can be a maximum possible value for the random backoff time. In an embodiment, the BI can be included in a random access response (RAR) sent from the node. In an example, the BI signaled for MTC wireless devices can be different from the BI signaled for the non-MTC wireless devices. In another example, the BI can be signaled for wireless devices configured for EAB can be different from the BI signaled for the wireless devices not configured for EAB.

In a configuration, the PRACH resource for the MTC and non-MTC wireless devices can be segregated. Because a media access control (MAC) layer protocol data unit (PDU) including RAR(s) can be tied to a PRACH resource, by segregating the PRACH resources for MTC and non-MTC wireless devices, a particular MAC PDU including RAR(s) may be destined for (e.g., received by) either MTC wireless devices or non-MTC wireless devices. Thus, the BI included in a MAC PDU including RAR(s) may be received either by MTC wireless devices or non-MTC wireless devices.

Figure 8:
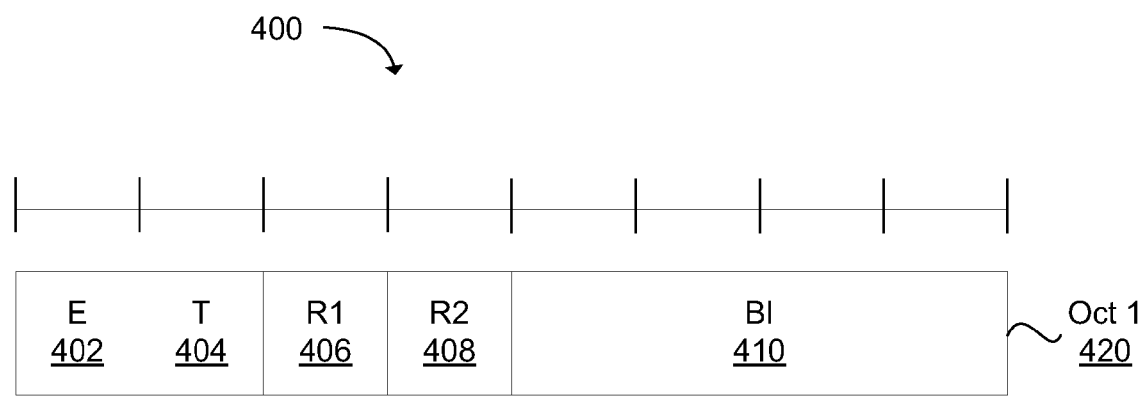
FIG. 8 illustrates a diagram of a random access response (RAR) media access control (MAC) subheader for a MAC protocol data unit (PDU) including a backoff indicator (BI) field in accordance with an example.

In another configuration, the PRACH resource can be substantially the same for the MTC and non-MTC wireless devices (e.g., the PRACH resource for the MTC and non-MTC wireless devices may not be segregated). The MTC and non-MTC wireless devices can listen to (e.g., receive) a substantially same RAR MAC PDU. The MAC PDU header can be modified to allow more than one BI subheader to be included in the MAC PDU header. In an example, at least two reserved bits (R) can be used to identify a MTC specific BI subheader, as illustrated in FIG. 8 for a E/T/R/R/BI MAC header 400, where 'E' 402 represents an extension field, 'T' 404 represents a type field, 'R' represents a reserved bit field (e.g., 'R1' 406 and 'R2' 408), and 'BI' 410 represents a BI field. The MTC specific BI subheader can be transmitted in octet 1 420 (e.g., 8 bits). In an example, the size of each field, except for BI, can be one bit. For example, MTC specific BI subheader field descriptions can include an extension field, a type field, a reserved bit field, and/or a BI field. The extension field "E" can be a flag indicating if more fields are present in the MAC header or not. The E field can be set to "1" to indicate at least another set of E/T/RAPID or E/T/R/R/BI fields follows. The E field can be set to "0" to indicate that a MAC RAR or padding starts at the next byte. The type field "T" can be a flag indicating whether the MAC subheader contains a random access ID or a backoff indicator. The T field can be set to "0" to indicate the presence of a backoff indicator field in the subheader (BI). The T field can be set to "1" to indicate the presence of a random access preamble ID field in the subheader (RAPID). The reserve bit field (e.g., "R1" and "R2") can be flags to indicate a presence of MTC-specific BI value or a presence of non-MTC BI value. When T is set to "0" indicating the presence of BI in the subheader, one of the two reserved bits (R1 or R2) can be set to "1" to indicate the presence of MTC-specific BI value. The reserve bit field can be set to "0" for non-MTC BI value. In one embodiment, R1 bit can be set to "1" to indicate the presence of MTC-specific BI value. In another embodiment, R2 bit is set to "1" to indicate the presence of MTC-specific BI value. The backoff indicator field "BI" can identify an overload condition in the cell. The size of the BI field can be 4 bits.

Using a backoff indicator (BI) can include a process for both the wireless device and the network (e.g., node). Referring back to FIG. 4, the wireless device can start the RA procedure without applying the random backoff 260, the wireless device can perform random backoff based on BI 262 before the wireless device starts the RA procedure, or the wireless device may perform random backoff 264 before starting the RA procedure based on the EAB information received or stored, as described in relation to FIG. 4, 5, or 6. The wireless device can perform random backoff 266 on a physical random access channel (PRACH) retransmission 268 based on the backoff parameter as indicated by a latest MTC BI.

When the wireless device starts the RA procedure without applying the random backoff 260, the wireless device configured with EAB can receive EAB information 202 broadcast from the network (e.g, the node). The wireless device can determine if EAB information has been previously stored in the wireless device 204. If EAB information has not been previously stored in the wireless device, the wireless device can store the received EAB information 208. If previously received EAB information has been stored in the wireless device, the wireless device can replace the existing stored EAB information 206 with the current EAB information received. When the upper layers request an establishment of an RRC connection while the wireless device is in an RRC_IDLE mode, the wireless device can check the current EAB information. If the EAB information is present and the EAB information indicates that the access is barred, the wireless device may not perform random access procedure for RRC connection establishment for mobile originating calls. The wireless device can inform upper layers that the RRC connection establishment request is barred. If no EAB information is stored or the stored EAB information indicates that the access is not barred, the wireless device can perform a RACH transmission procedure (including a PRACH preamble transmission) without random backoff. In an embodiment if a RACH transmission fails, the wireless device can count a random backoff time based on the backoff parameter as indicated by the latest MTC BI 266. The wireless device can perform a PRACH retransmission 268 after the expiry of the random backoff timer. In an embodiment, the wireless device can recursively perform the steps of 266 and 268 until either the maximum limit of recursion is reached or the RACH transmission is successful and a RRC connection with the node is made.

When the wireless device performs random backoff based on BI 262 before the wireless device starts the RA procedure, no EAB information may be available or EAB information may indicate that the access is not barred. If the upper layers request establishment of an RRC connection while the wireless device is in RRC_IDLE mode, the wireless device can perform a random backoff based on the backoff parameter as indicated by a latest MTC BI value received before starting the RA procedure. In an embodiment if a RACH transmission fails, the wireless device can count a random backoff time based on the backoff parameter as indicated by the latest MTC BI 266. The wireless device can perform a PRACH retransmission 268 after the expiry of the random backoff timer. In an embodiment, the wireless device can recursively perform the steps of 266 and 268 until either the maximum limit of recursion is reached or the RACH transmission is successful and a RRC connection with the node is made.

When the wireless device performs random backoff 264 before starting the RA procedure based on the EAB information received or stored, as described in relation to FIG. 4, 5, or 6, the wireless device can count a random backoff time based on the backoff parameter as indicated by the latest MTC BI 266 if a RACH transmission fails. The wireless device can perform a PRACH preamble retransmission 268 after the expiry of the random backoff timer. In an embodiment, the wireless device can recursively perform the steps of 266 and 268 until either the maximum limit of recursion is reached or the RACH transmission is successful and a RRC connection with the node is made.

At a network side (e.g. at the node), a module on the network side can inform the wireless devices about the backoff (via the BI) for PRACH preamble retransmission or a random backoff time (or a maximum backoff time period from which a random backoff time can be derived) for starting RA procedure by the use of the MTC-specific BI parameter in the random access response (RAR) message. Based on the traffic conditions, the network can adaptively change the value of BI to be included in the RAR. If the system is more congested, the BI can be a higher value so that the wireless devices can increase the backoff delay before retrying. When the system becomes less congested, the BI can be a lower value so that the wireless devices can decrease the backoff delay before retrying. Based on the segregated PRACH resource for the MTC and non-MTC wireless devices or the non-segregated PRACH resource for the MTC and non-MTC wireless devices using the MTC specific BI subheader, the value of BI can be informed to MTC-wireless devices either via MTC-specific PRACH resources or via MTC-specific BI subheader.

The backoff mechanism disclosed for EAB can be used to reduce clustering of MTC wireless device's RACH attempts when the barring of a particular AC is lifted.

Figure 9:
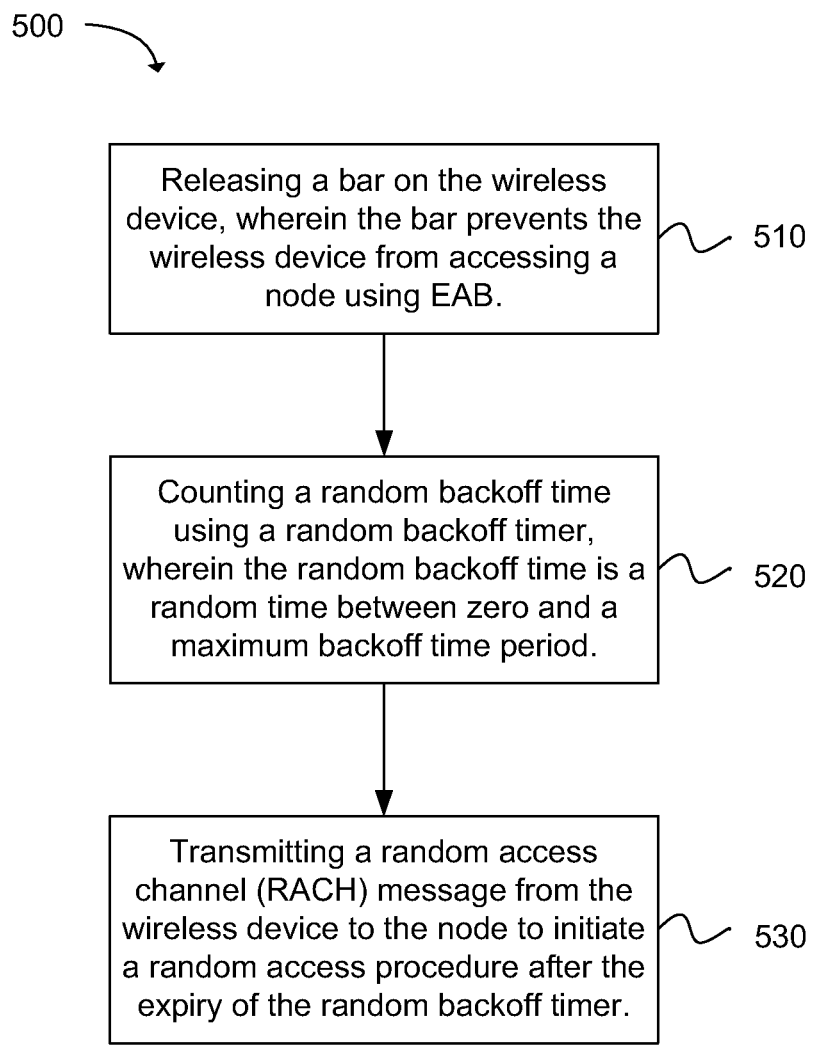
FIG. 9 depicts a flow chart of a method for initiating a random access procedure by a wireless device after extended access barring (EAB) in accordance with an example.

Another example provides a method 500 for initiating a random access procedure by a wireless device after extended access barring (EAB), as shown in the flow chart in FIG. 9. The method may be executed as instructions on a machine, where the instructions are included on at least one computer readable medium or one non-transitory machine readable storage medium. The method includes the operation of releasing a bar on the wireless device, wherein the bar prevents the wireless device from accessing a node using EAB, as in block 510. The operation of counting a random backoff time using a random backoff timer, wherein the random backoff time is a random time between zero and a maximum backoff time period follows, as in block 520. The next operation of the method can be transmitting a random access channel (RACH) message from the wireless device to the node to initiate a random access procedure after the expiry of the random backoff timer, as in block 530.

The method can further include the wireless device receiving a radio resource control (RRC) connection establishment request from upper layers for an originating call in a RRC idle state prior to counting the random backoff time. In another example, the method can further include the wireless device queuing the RRC connection establishment request at the access stratum of the wireless device before the expiry of the random backoff timer. In another configuration, the method can further include the wireless device establishing a radio resource control (RRC) connection with the node after the expiry of the random backoff timer.

In another example, the method can further include the wireless device receiving the maximum backoff time period from the node, and configuring the random backoff time with the maximum backoff time period. The maximum backoff time period can be received via broadcast, multicast, or unicast radio resource control (RRC) signaling. In another configuration, the method can further include the wireless device calculating the random backoff time, and informing upper layers of the wireless device that access is barred using EAB for the random backoff time. In another example, the method can further include, prior to transmitting the RACH message, the wireless device verifying that the wireless device is still not barred using updated EAB information, waiting for a release of the bar when the wireless device is barred using EAB, releasing the bar on the wireless device, and counting the random backoff time using a random backoff timer. In another configuration, the method can further include the wireless device receiving EAB information barring the wireless device from accessing a node while counting a random backoff time, stopping the random backoff timer, waiting for a release of the bar, releasing the bar on the wireless device, and recounting the random backoff time using a random backoff timer. In another example, the method can further include the wireless device receiving EAB information from the node, and storing the EAB information. In another configuration, the method can further include the wireless device receiving EAB information from the node, and replacing existing EAB information with the received EAB information.

Figure 10:
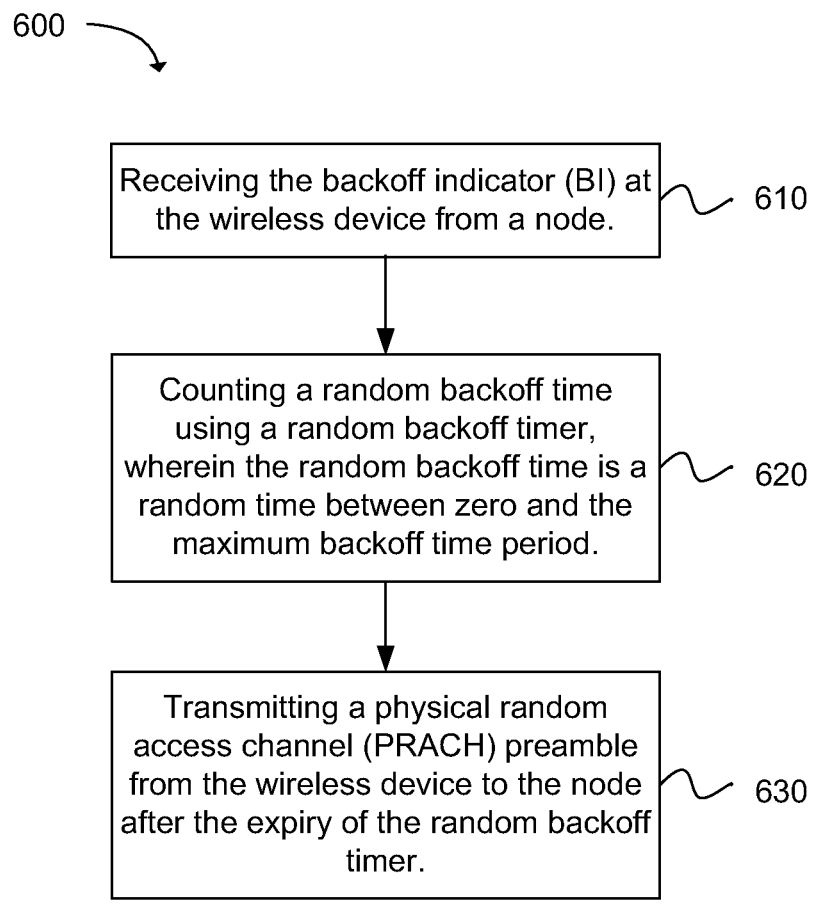
FIG. 10 depicts a flow chart of a method for using adaptive random backoff based on a backoff indicator (BI) at a wireless device in accordance with an example.

Another example provides a method 600 for using adaptive random backoff based on a backoff indicator (BI) at a wireless device after extended access barring (EAB), as shown in the flow chart in FIG. 10. The method may be executed as instructions on a machine, where the instructions are included on at least one computer readable medium or one non-transitory machine readable storage medium. The method includes the operation of receiving the backoff indicator (BI) at the wireless device from a node, as in block 610. The operation of counting a random backoff time using a random backoff timer, wherein the random backoff time is a random time between zero and the maximum backoff time period follows, as in block 620. The next operation of the method can be retransmitting a physical random access channel (PRACH) preamble from the wireless device to the node after the expiry of the random backoff timer, as in block 630.

In a configuration, an operation of configuring a maximum backoff time period using the BI can occur after receiving the BI at the wireless device. For an initial or first PRACH preamble transmission, an operation of releasing a bar on the wireless device can occur, wherein the bar prevents the wireless device from accessing a node using EAB.

In an example, the operation of receiving the backoff indicator (BI) can further include receiving a dedicated machine type communication (MTC) random access response (RAR) media access control (MAC) layer protocol data unit (PDU). The RAR can be associated with a PRACH resource. The PRACH resources can be segregated resulting in segregated RAR MAC PDUs (e.g., dedicated MTC RAR MAC PDUs and dedicated non-MTC RAR MAC PDUs) corresponding to the PRACH resources. The dedicated MTC RAR MAC PDU can be sent to MTC devices, and a dedicated non-MTC RAR MAC PDU can be sent to non-MTC devices. In another example, the BI can be included in a random access response (RAR) media access control (MAC) layer protocol data unit (PDU). The BI can be included in a machine type communication (MTC) specific BI subheader. In another configuration, the method can further include the wireless device transmitting a random access channel (RACH) message to the node to initiate a random access procedure prior to retransmitting the PRACH. In another example, the method can further include the wireless device counting the random backoff time using a random backoff timer, and transmitting a random access channel (RACH) message from the wireless device to the node to initiate a random access procedure after the expiry of the random backoff timer prior to counting the random backoff time a subsequent time and retransmitting the PRACH. The wireless device can receive a radio resource control (RRC) connection establishment request from upper layers for an originating call in a RRC idle state prior to counting the random backoff time. In another configuration, the method can further include the wireless device establishing a radio resource control (RRC) connection between the wireless device and the node after the expiry of the random backoff timer. The wireless device can receive EAB information from the node and store the EAB information. In another example, the wireless device can receive EAB information from the node, and replace existing EAB information with the received EAB information.

Figure 11:
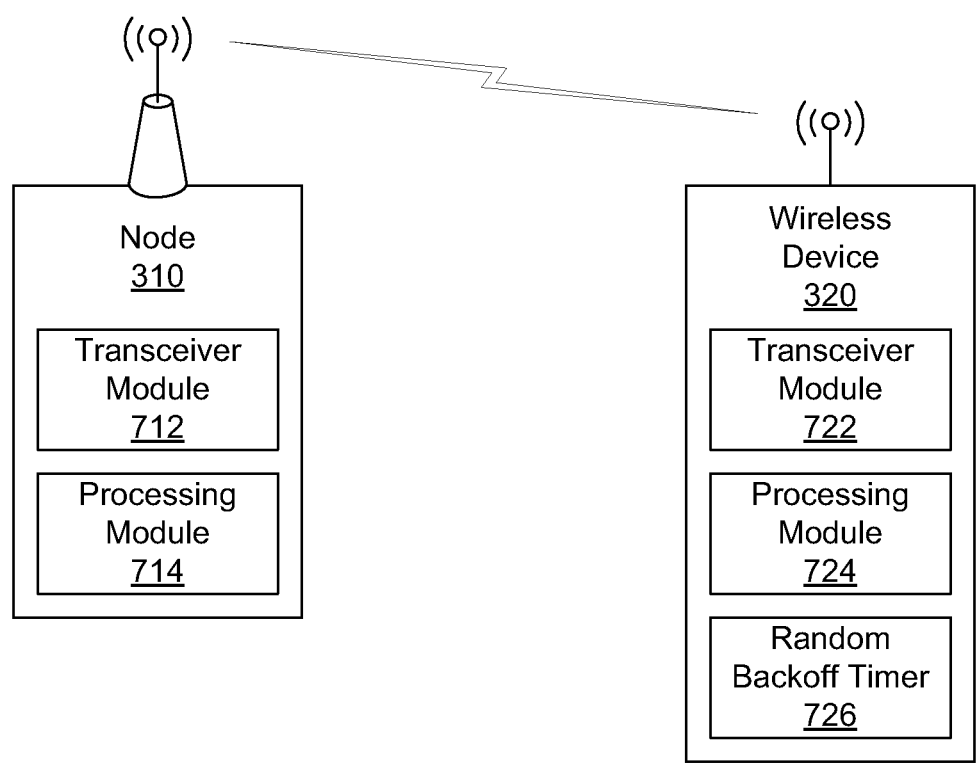
FIG. 11 illustrates a block diagram of a node and a wireless device in accordance with an example.

FIG. 11 illustrates an example node 310 in communication with an example wireless device 320 configured for extended access barring (EAB). The node can include a transceiver module 712 and a processing module 714. The transceiver module of the node can be configured to transmit EAB information to the wireless device, receive a random access channel (RACH) message (including physical random access channel (PRACH) preamble) from the wireless device, and transmit a machine type communication (MTC) specific BI parameter to the wireless device. The MTC-specific BI parameter can be transmitted in a random access response (RAR) media access control (MAC) layer protocol data unit (PDU). The processing module of the node can be configured to adaptively change the value of the MTC-specific BI parameter based on traffic conditions. The MTC-specific BI parameter can inform the wireless device of a delay between a release of an EAB bar and an attempt for a radio resource control (RRC) connection between the node and the wireless device. In an example, the node can include a base station (BS), a node B (NB), an evolved node B (eNB), a macro-eNB, a micro-eNB, a pico-eNB, a femto-eNB, or a home eNB (HeNB). In addition, the transceiver module and the processing module of the node can be configured to provide the functionality for EAB related to the node as previously described.

The wireless device 320 can include a transceiver module 722, a processing module 724, and a random backoff timer 726. The transceiver module of the wireless device can be configured to receive EAB information from the node and transmit a random access channel (RACH) message (including physical random access channel (PRACH) preamble) to the node. The processing module of the wireless device can be configured to bar transmissions and release a bar to transmission to the node using the EAB information. The bar can prevent the wireless device from accessing the node using EAB. The random backoff timer can be configured to count a random backoff time. The random backoff time can be a random time between zero and a maximum backoff time period. The random backoff timer can be configured to delay a radio resource control (RRC) connection after the release of the bar for the random backoff time. In addition, the transceiver module, the processing module, and the random backoff timer of the wireless device can be configured to provide the functionality for EAB related to the wireless device as previously described.

In another example, the processing module can be further configured to initiate a random access procedure after the expiry of the random backoff timer. The transceiver module can be further configured to retransmit a physical random access channel (PRACH) preamble to the node after the expiry of the random backoff timer. In another configuration, the transceiver module can be further configured to receive a RRC connection establishment request from upper layers for an originating call at the wireless device in a RRC idle state prior to counting the random backoff time. In another example, the transceiver module can be further configured to receive the maximum backoff time period or a backoff indicator (BI) from the node. The maximum backoff time period can be set using the BI. The BI can be included in a dedicated machine type communication (MTC) random access response (RAR) media access control (MAC) layer protocol data unit (PDU) or a MTC specific BI subheader. The RAR can be associated with a PRACH resource. The PRACH resources can be segregated which can result in segregated RAR MAC PDUs (e.g., dedicated MTC RAR MAC PDUs and dedicated non-MTC RAR MAC PDUs). A dedicated MTC RAR MAC PDU can be sent to MTC devices, and a dedicated non-MTC RAR MAC PDU can be sent to non-MTC devices.

Figure 12:
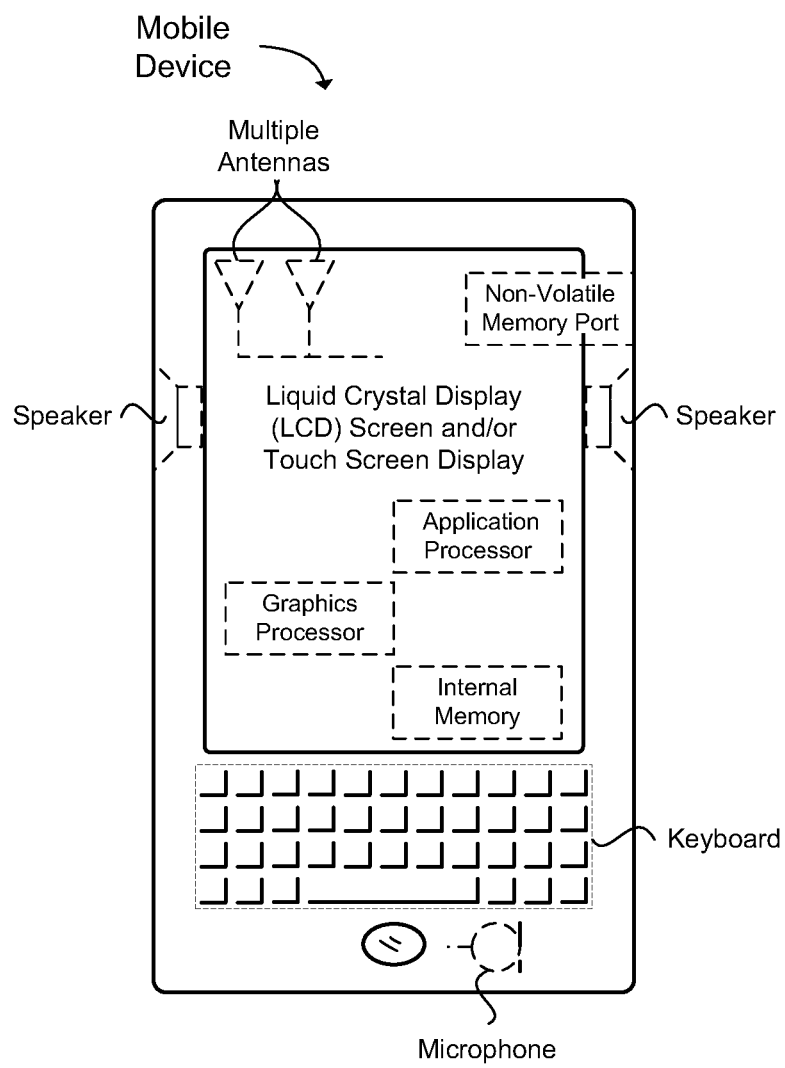
FIG. 12 illustrates a diagram of a wireless device in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with node, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, 3GPP LTE-Advanced, 3GPP UMTS, GSM, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for initiating a random access procedure by a wireless device after extended access barring (EAB), comprising:
  receiving updated EAB information at the wireless device from the node;
  determining that a bar on the wireless device is released in the updated EAB information, wherein the bar prevents the wireless device from accessing a node using EAB;
  counting a random backoff time at the wireless device using a random backoff timer, wherein the random backoff time is a random time between zero and a maximum backoff time period;
  informing upper layers of the wireless device that access is barred using EAB for the random backoff time; and
  transmitting a random access channel (RACH) message from the wireless device to the node to initiate a random access procedure after the expiry of the random backoff timer.

2. The method of claim 1, further comprising:
  receiving a radio resource control (RRC) connection establishment request from upper layers for an originating call at the wireless device in a RRC idle state prior to counting the random backoff time.

3. The method of claim 2, further comprising:
  queuing the RRC connection establishment request at the access stratum of the wireless device before the expiry of the random backoff timer.

4. The method of claim 1, further comprising:
establishing a radio resource control (RRC) connection between the wireless device and the node after the expiry of the random backoff timer.

5. The method of claim 1, further comprising:
receiving the maximum backoff time period at the wireless device from the node; and
configuring the random backoff time at the wireless device with the maximum backoff time period.

6. The method of claim 5, wherein receiving the maximum backoff time period is received via broadcast, multicast, or unicast radio resource control (RRC) signaling.

7. The method of claim 1, further comprising prior to transmitting the RACH message:
verifying the wireless device is still not barred using updated EAB information;
when the wireless device is barred using EAB, waiting for a release of the bar;
releasing the bar on the wireless device; and
counting the random backoff time using a random backoff timer.

8. The method of claim 1, further comprising:
receiving EAB information barring the wireless device from accessing a node while counting a random backoff time;
stopping the random backoff timer;
waiting for a release of the bar;
releasing the bar on the wireless device; and
recounting the random backoff time using a random backoff timer.

9. The method of claim 1, further comprising:
receiving EAB information at the wireless device from the node; and
storing the EAB information at the wireless device.

10. At least one non-transitory machine readable storage medium comprising a plurality of instructions adapted to be executed to implement the method according to claim 1.

11. At least one non-transitory machine readable storage medium comprising a plurality of instructions adapted to be executed to implement the method according to claim 1.

12. A method for using adaptive random backoff based on a backoff indicator (BI) at a wireless device, comprising:
receiving an updated backoff indicator (BI) at the wireless device from a node, wherein receiving the BI includes receiving a dedicated machine type communication (MTC) random access response (RAR) media access control (MAC) layer protocol data unit (PDU), wherein the RAR is associated with a PRACH resource, PRACH resources are segregated into dedicated MTC RAR MAC PDUs and dedicated non-MTC RAR MAC PDUs, the dedicated MTC RAR MAC PDU is sent to MTC devices, and a dedicated non-MTC RAR MAC PDU is sent to non-MTC devices;
determining that a bar on the wireless device is released in the updated BI, wherein the bar prevents the wireless device from accessing a node;
counting a random backoff time using a random backoff timer, wherein the random backoff time is a random time between zero and a maximum backoff time period; and
transmitting a physical random access channel (PRACH) preamble from the wireless device to the node after the expiry of the random backoff timer.

13. The method of claim 12, wherein the BI is included in a random access response (RAR) media access control (MAC) layer protocol data unit (PDU).

14. The method of claim 13, wherein the BI is included in a machine type communication (MTC) specific BI sub header.

15. The method of claim 12, further comprising:
transmitting a random access channel (RACH) message from the wireless device to the node to initiate a random access procedure prior to retransmitting the PRACH preamble.

16. The method of claim 12, further comprising:
counting the random backoff time using a random backoff timer; and
transmitting a random access channel (RACH) message from the wireless device to the node to initiate a random access procedure after the expiry of the random backoff timer prior to counting the random backoff time a second time and retransmitting the PRACH preamble.

17. The method of claim 12, further comprising:
receiving a radio resource control (RRC) connection establishment request from upper layers for an originating call at the wireless device in a RRC idle state prior to counting the random backoff time.

18. The method of claim 12, further comprising:
establishing a radio resource control (RRC) connection between the wireless device and the node after the expiry of the random backoff timer.

19. The method of claim 12, further comprising:
receiving EAB information at the wireless device from the node; and
storing the EAB information at the wireless device.

20. The method of claim 12, further comprising:
receiving EAB information at the wireless device from the node; and
replacing existing EAB information at the wireless device with the received EAB information.

21. A wireless device configured for extended access barring (EAB), comprising:
a transceiver module configured to receive updated EAB information from a node and transmit a random access channel (RACH) message to the node;
a processing module configured to determine that a bar on the wireless device is released in the updated EAB information, wherein the bar prevents the wireless device from accessing the node using EAB; and
a random backoff timer configured to count a random backoff time, wherein the random backoff time is a random time between zero and a maximum backoff time period and the random backoff timer is configured to delay a radio resource control (RRC) connection after the release of the bar for the random backoff time
wherein the wireless device is selected from the group consisting of a user equipment (UE) and a mobile station (MS), the wireless device is configured to connect to at least one of a wireless local area network (WLAN), a wireless personal area network (WPAN), and a wireless wide area network (WWAN), and the wireless device includes an antenna, a touch sensitive display screen, a speaker, a microphone, a graphics processor, an application processor, internal memory, or combinations thereof.

22. The wireless device of claim 21, wherein the processing module is further configured to initiate a random access procedure after the expiry of the random backoff timer.

23. The wireless device of claim 21, wherein the transceiver module is further configured to retransmit a physical random access channel (PRACH) preamble to the node after the expiry of the random backoff timer or the transceiver module is further configured to receive a RRC connection establishment request from upper layers for an originating call at the wireless device in a RRC idle state prior to counting the random backoff time.

24. The wireless device of claim 21, wherein the transceiver module is further configured to receive the maximum backoff time period or a backoff indicator (BI) from the node, wherein the maximum backoff time period is set using the BI, the BI is included in a dedicated machine type communication (MTC) random access response (RAR) media access control (MAC) layer protocol data unit (PDU) or a MTC specific BI subheader, the RAR is associated with a PRACH resource, PRACH resources are segregated into dedicated MTC RAR MAC PDUs and dedicated non-MTC RAR MAC PDUs, a dedicated MTC RAR MAC PDU is sent to MTC devices, and a dedicated non-MTC RAR MAC PDU is sent to non-MTC devices.

25. The wireless device of claim 21, wherein the transceiver module is further configured to receive the maximum backoff time period or a backoff indicator (BI) from the node, wherein the maximum backoff time period is set using the BI, and the BI is included in a random access response (RAR) media access control (MAC) layer protocol data unit (PDU) machine type communication (MTC) specific BI subheader by a specific combination of bits following a type field bit.

* * * * *